US009369390B2

(12) United States Patent
Bantukul et al.

(10) Patent No.: US 9,369,390 B2
(45) Date of Patent: Jun. 14, 2016

(54) METHODS, SYSTEMS, AND COMPUTER READABLE MEDIA FOR PROVIDING A THINKING DIAMETER NETWORK ARCHITECTURE

(71) Applicant: Tekelec, Inc., Morrisville, NC (US)

(72) Inventors: Apirux Bantukul, Cary, NC (US); Joanne Steinberg, Raleigh, NC (US); Sam Eric McMurry, Richardson, TX (US)

(73) Assignee: Tekelec, Inc., Morrisville, NC (US)

( * ) Notice: Subject to any disclaimer, the term of this patent is extended or adjusted under 35 U.S.C. 154(b) by 151 days.

(21) Appl. No.: 14/182,864

(22) Filed: Feb. 18, 2014

(65) Prior Publication Data

US 2014/0233389 A1    Aug. 21, 2014

Related U.S. Application Data

(60) Provisional application No. 61/766,099, filed on Feb. 18, 2013.

(51) Int. Cl.
  *H04L 12/24*  (2006.01)
  *H04L 12/801*  (2013.01)

(52) U.S. Cl.
  CPC .......... *H04L 47/127* (2013.01); *H04L 41/0896* (2013.01); *H04L 41/12* (2013.01); *H04L 41/147* (2013.01)

(58) Field of Classification Search
  None
  See application file for complete search history.

(56) References Cited

U.S. PATENT DOCUMENTS

| 8,665,717 | B2 | 3/2014 | Kotecha et al. |
| 2002/0091810 | A1 | 7/2002 | Hundscheidt et al. |
| 2004/0199632 | A1* | 10/2004 | Romero ............... G06F 9/5077 709/226 |
| 2009/0232011 | A1 | 9/2009 | Li et al. |

(Continued)

FOREIGN PATENT DOCUMENTS

| KR | 10-2009-0033968 | 4/2009 |
| KR | 10-2012-0055955 | 6/2012 |

(Continued)

OTHER PUBLICATIONS

Commonly-assigned, co-pending U.S. Appl. No. 14/692,710 for "Methods, Systems, and Computer Readable Media for Multi-Layer Orchestration in Software Defined Networks (SDNs)," (Unpublished, filed Apr. 21, 2015).

(Continued)

*Primary Examiner* — Kevin C Harper
*Assistant Examiner* — Derrick V Rose
(74) *Attorney, Agent, or Firm* — Jenkins, Wilson, Taylor & Hunt, P.A.

(57) ABSTRACT

The subject matter described herein includes methods, systems, and computer readable media for providing a thinking Diameter network architecture. A system for providing a thinking Diameter network architecture includes a network event listener for receiving information about network events and for providing a real time or predictive view of network conditions. The system further includes a policy directed software defined network (SDN) controller for, based on the real time or predictive view of network conditions, issuing SDN commands to route Internet protocol (IP) flows to needed network elements and to instruct dynamically configurable network elements to instantiate Diameter resource instances or to allocate hardware among existing Diameter resource instances.

20 Claims, 5 Drawing Sheets

(56) References Cited

U.S. PATENT DOCUMENTS

| | | | |
|---|---|---|---|
| 2009/0327079 | A1 | 12/2009 | Parker et al. |
| 2010/0071035 | A1 | 3/2010 | Budko et al. |
| 2010/0080172 | A1 | 4/2010 | Jin et al. |
| 2010/0103861 | A1 | 4/2010 | Ulupinar et al. |
| 2010/0125477 | A1 | 5/2010 | Mousseau et al. |
| 2010/0211956 | A1 | 8/2010 | Gopisetty et al. |
| 2010/0217850 | A1 | 8/2010 | Ferris |
| 2011/0016467 | A1 | 1/2011 | Kane |
| 2011/0131332 | A1 | 6/2011 | Bouazizi |
| 2011/0200053 | A1 | 8/2011 | Kanode et al. |
| 2011/0202676 | A1 | 8/2011 | Craig et al. |
| 2012/0123870 | A1 | 5/2012 | Denman et al. |
| 2012/0140665 | A1 | 6/2012 | Li et al. |
| 2012/0158994 | A1* | 6/2012 | McNamee .............. H04L 41/12 709/238 |
| 2012/0300615 | A1 | 11/2012 | Kempf et al. |
| 2012/0303835 | A1 | 11/2012 | Kempf et al. |
| 2013/0003745 | A1 | 1/2013 | Nishimura |
| 2013/0019277 | A1 | 1/2013 | Chang et al. |
| 2013/0044645 | A1 | 2/2013 | Castro Castro et al. |
| 2013/0064093 | A1 | 3/2013 | Ridel et al. |
| 2013/0086279 | A1 | 4/2013 | Archer et al. |
| 2013/0124712 | A1 | 5/2013 | Parker |
| 2013/0173810 | A1* | 7/2013 | Subramaniam ....... G06F 15/161 709/227 |
| 2013/0250770 | A1 | 9/2013 | Zou et al. |
| 2013/0263208 | A1 | 10/2013 | Challa |
| 2013/0343295 | A1 | 12/2013 | Deo |
| 2014/0026231 | A1 | 1/2014 | Barak et al. |
| 2014/0059678 | A1 | 2/2014 | Parker |
| 2014/0105140 | A1 | 4/2014 | Guo |
| 2014/0172739 | A1 | 6/2014 | Anderson et al. |
| 2014/0189137 | A1 | 7/2014 | Castro Castro et al. |
| 2014/0193154 | A1* | 7/2014 | Graham .................. H04L 67/28 398/79 |
| 2014/0204796 | A1 | 7/2014 | Bantukul |
| 2014/0237111 | A1 | 8/2014 | McMurry et al. |
| 2014/0304416 | A1 | 10/2014 | Khasnabish |
| 2014/0310388 | A1 | 10/2014 | Djukic et al. |
| 2014/0348068 | A1 | 11/2014 | Morper et al. |
| 2015/0085663 | A1 | 3/2015 | McMurry et al. |
| 2015/0142940 | A1 | 5/2015 | McMurry et al. |
| 2015/0149656 | A1 | 5/2015 | McMurry et al. |
| 2015/0215228 | A1 | 7/2015 | McMurry |

FOREIGN PATENT DOCUMENTS

| | | |
|---|---|---|
| KR | 10-2012-0059542 | 6/2012 |
| WO | WO 2009/070179 A1 | 6/2009 |
| WO | WO 2012/055446 A1 | 5/2012 |
| WO | WO 2012/063106 A1 | 5/2012 |
| WO | WO 2012/100092 A2 | 7/2012 |
| WO | WO 2012/149954 A1 | 11/2012 |
| WO | WO 2012/160465 A1 | 11/2012 |
| WO | WO 2013/188665 A1 | 12/2013 |
| WO | WO 2014/127346 A1 | 8/2014 |
| WO | WO 2014/127347 A1 | 8/2014 |
| WO | WO 2015/041750 A1 | 3/2015 |
| WO | WO 2015/077377 A1 | 5/2015 |
| WO | WO 2015/080906 A1 | 6/2015 |
| WO | WO 2015/116449 A1 | 8/2015 |

OTHER PUBLICATIONS

Notification of Transmittal of the International Search Report and the Written Opinion of the International Searching Authority, or the Declaration for International Application No. PCT/US2014/066240 (May 13, 2015).

Final Office Action for U.S. Appl. No. 13/749,655 (Apr. 3, 2015).

Notification of Transmittal of the International Search Report and the Written Opinion of the International Searching Authority, or the Declaration for PCT International Application No. PCT/US2015/012250 (Mar. 31, 2015).

Communication of European Publication Number and Information on the Application of Article 67(3) EPC for European Application No. 13804779.0 (Mar. 25, 2015).

Non-Final Office Action for U.S. Appl. No. 14/034,478 (Mar. 23, 2015).

Non-Final Office Action for U.S. Appl. No. 13/917,200 (Mar. 16, 2015).

Notification of Transmittal of the International Search Report and the Written Opinion of the International Searching Authority, or the Declaration for International Application No. PCT/US2014/066469 (Feb. 20, 2015).

"Network Function Virtualization (NFV) Management and Orchestration," ETSI, Group Specification, GS NFV-MAN 001 V0.0.11, pp. 1-74 (Oct. 18, 2013).

"Split Architecture for Large Scale Wide Area Networks," SPARC ICT-258457 Deliverable D3.3, pp. 1-129 (Dec. 1, 2011).

Commonly-assigned, co-pending International Application No. PCT/US15/12250 for "Methods, Systems, and Computer Readable Media for a Cloud-Based Virtualization Orchestrator," (Unpublished, filed Jan. 21, 2015).

Commonly-assigned, co-pending International Application No. PCT/US14/66469 for "Methods, Systems, and Computer Readable Media for a Network Function Virtualization Information Concentrator," (Unpublished, filed Nov. 19, 2014).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (Nov. 17, 2014).

Non-Final Office Action for U.S. Appl. No. 13/749,655 (Sep. 3, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Notification of Transmittal of the International Search Report and the Written Opinion of the International Searching Authority, or the Declaration for International Application No. PCT/US2014/016853 (Jun. 6, 2014).

Notification of Transmittal of the International Search Report and the Written Opinion of the International Searching Authority, or the Declaration for International Application No. PCT/US2014/016860 (Jun. 4, 2014).

Notification of Transmittal of the International Search Report and the Written Opinion of the International Searching Authority, or the Declaration for International Application No. PCT/US2014/011551 (Apr. 28, 2014).

Commonly-assigned, co-pending U.S. Appl. No. 14/166,790 for "Methods, Systems, and Computer Readable Media for a Cloud-Based Virtualization Orchestrator," (Unpublished, filed Jan. 28, 2014).

Commonly-assigned, co-pending International Application No. PCT/US14/11551 for "Methods, Systems, and Computer Readable Media for Using Policy Knowledge of or Obtained by a Policy and Charging Rules Function (PCRF) for Needs Based Forwarding of Bearer Session Traffic to Network Nodes," (Unpublished, filed January.

Commonly-assigned, co-pending U.S. Appl. No. 14/086,950 for "Methods, Systems, and Computer Readable Media for a Network Function Virtualization Information Concentrator," (Unpublished, filed Nov. 21, 2013).

Commonly-assigned, co-pending U.S. Appl. No. 14/034,478 for "Methods, Systems, and Computer Readable Media for Diameter Load and Overload Information and Virtualization," (Unpublished, filed Sep. 23, 2013).

Notification of Transmittal of the International Search Report and the Written Opinion of the International Searching Authority, or the Declaration for International Application No. PCT/US2013/045652 (Sep. 17, 2013).

(56) References Cited

OTHER PUBLICATIONS

Tschofenig, "Diameter Overload Architecture and Information Model," draft-tschofenig-dime-overload-arch-00.txt, DIME, pp. 1-9 (Jul. 16, 2013).

"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).

Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).

"3rd Generation Partnership Project; Technical Specification Group Services and System Aspects; Policy and charging control architecture (Release 11)," 3GPP TS 23.203, V11.8.0 pp. 1-179 (Dec. 2012).

Fajardo et al., "Diameter Base Protocol," RFC 6733, pp. 1-152 (Oct. 2012).

"Software-Defined Networking: The New Norm for Networks," ONF White Paper, Open Networking Foundation, pp. 1-12 (Apr. 13, 2012).

"OpenFlow Switch Specification," Version 1.1.0 Implemented (Wire Protocol 0x02), www.openflow.org, pp. 1-56 (Feb. 28, 2011).

Chapman et al., "Software architecture definition for on-demand cloud provisioning," Cluster Computing, vol. 15, No. 2, pp. 79-100 Feb. 27, 2011).

3rd Generation Partnership Project, "Technical Specification Group Services and System Aspects; Policy and charging control architecture (Release 9)," 3GPP TS 23.203 V9.3.0 (Dec. 2009).

Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).

"Introduction to Evolved Packet Core," White Paper, Alcatel-Lucent, 11 pgs. (2009).

Non-Final Office Action for U.S. Appl. No. 14/086,950 (Dec. 4, 2015).

Supplemental Notice of Allowability for U.S. Appl. No. 14/182,800 (Dec. 1, 2015).

Communication of European Publication Number and Information on the Application of Article 67(3) EPC for European Patent Application No. 14710682.7 (Nov. 25, 2015).

Advisory Action for U.S. Appl. No. 14/034,478 (Nov. 17, 2015).

Notice of Allowance and Fee(s) Due for U.S. Appl. No. 14/182,800 (Nov. 10, 2015).

Communication of European Publication Number and Information on the Application of Article 67(3) EPC for European Patent Application No. 14703974.7 (Nov. 4, 2015).

Final Office Action for U.S. Appl. No. 13/917,200 (Oct. 22, 2015).

Non-Final Office Action for U.S. Appl. No. 14/092,898 (Oct. 8, 2015).

Final Office Action for U.S. Appl. No. 14/034,478 (Sep. 8, 2015).

Applicant-Initiated Interview Summary for U.S. Appl. No. 13/917,200 (Jul. 27, 2015).

Advisory Action Before the Filing of an Appeal Brief, Examiner-Initiated Interview Summary and AFCP 2.0 Decision for U.S. Appl. No. 13/749,655 (Jul. 24, 2015).

Amendment for U.S. Appl. No. 13/749,655 (Jul. 6, 2015).

* cited by examiner

METHODS, SYSTEMS, AND COMPUTER READABLE MEDIA FOR PROVIDING A THINKING DIAMETER NETWORK ARCHITECTURE

PRIORITY CLAIM

This application claims the benefit of U.S. Provisional Patent Application Ser. No. 61/766,099, filed Feb. 18, 2013; the disclosure of which is incorporated herein by reference in its entirety.

TECHNICAL FIELD

The subject matter described herein relates to providing a Diameter network architecture that is responsive to network conditions or events and that predictively responds to anticipated network conditions or events. More particularly, the subject matter described herein includes methods, systems, and computer readable media for providing a thinking Diameter network architecture.

BACKGROUND

In current telecommunications network architectures, networks are engineered or statically provisioned for maximum capacity during peak hours. During off-peak hours, equipment is often idle. Accordingly, network resources are wasted, resulting in unnecessary capital expenditures by the network operators.

Even in current statically provisioned network architectures, it is desirable for the respond with policies and resource allocations that predictively respond to network conditions or events. Currently, policy directed network and subscriber management can occur based on subscriber tier. It is desirable to provide a network architecture that extends policy directed network and subscriber management to actual and predicted network conditions. Allocating network resources in response to actual network conditions may in some instances be too late to respond the conditions. For example, allocating new network resources based on current network congestion may be too late to abate the congestion. Accordingly, there exists a need for methods, systems, and computer readable media for providing a thinking Diameter network architecture for predictively responding to network conditions.

SUMMARY

The subject matter described herein includes methods, systems, and computer readable media for providing a thinking Diameter network architecture. A system for providing a thinking Diameter network architecture includes a network event listener for receiving information about network events and for providing a real time or predictive view of network conditions. The system further includes a policy directed software defined network (SDN) controller for, based on the real time or predictive view of network conditions, issuing SDN commands to route Internet protocol (IP) flows to needed network elements and to instruct dynamically configurable network elements to instantiate Diameter resource instances.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

It is desirable for networks to evolve into software-defined thinking networks. Like the human mind, these networks think at least partially for themselves. The networks process new information with information already known, morphing and gaining more intelligence as time, events, and content are added from a multitude of sources. Thinking networks self-organize, self-optimize, and self-determine responses to unprecedented and unpredictable events. They anticipate subscribers' behaviors and future preference patterns. Operators are able to understand to their subscribers' digital lifestyles, including where they work or travel, what devices they use, and what they like and dislike. Armed with that level of subscriber knowledge, operators are able to craft a highly personalized and relevant subscriber experience that matches each subscriber's need. Moreover, operators can apply the data to new services and content in real time. The foundation of thinking networks is the new Diameter network. The new Diameter network embodies the intelligence and control assets to enable service providers to manage their businesses independently of the underlying network technology. This approach simplifies the network architecture by eliminating redundant control elements.

The extreme flexibility of thinking networks supports different streams for best effort Internet traffic, OTT subsidized data, machine to machine (M2M), and cloud services using policy directed SDN control and advanced network event reporting capabilities. Network control expands beyond bandwidth, applications, time, and speed. It includes signaling, computing resources, devices, and IP flows, allowing operators to monetize M2M quality of experience (QoE). At this stage, the network provides the flexibility and innovation that is essential to enabling new business models and services that are the hallmarks of digital lifestyle providers.

Figure 1:
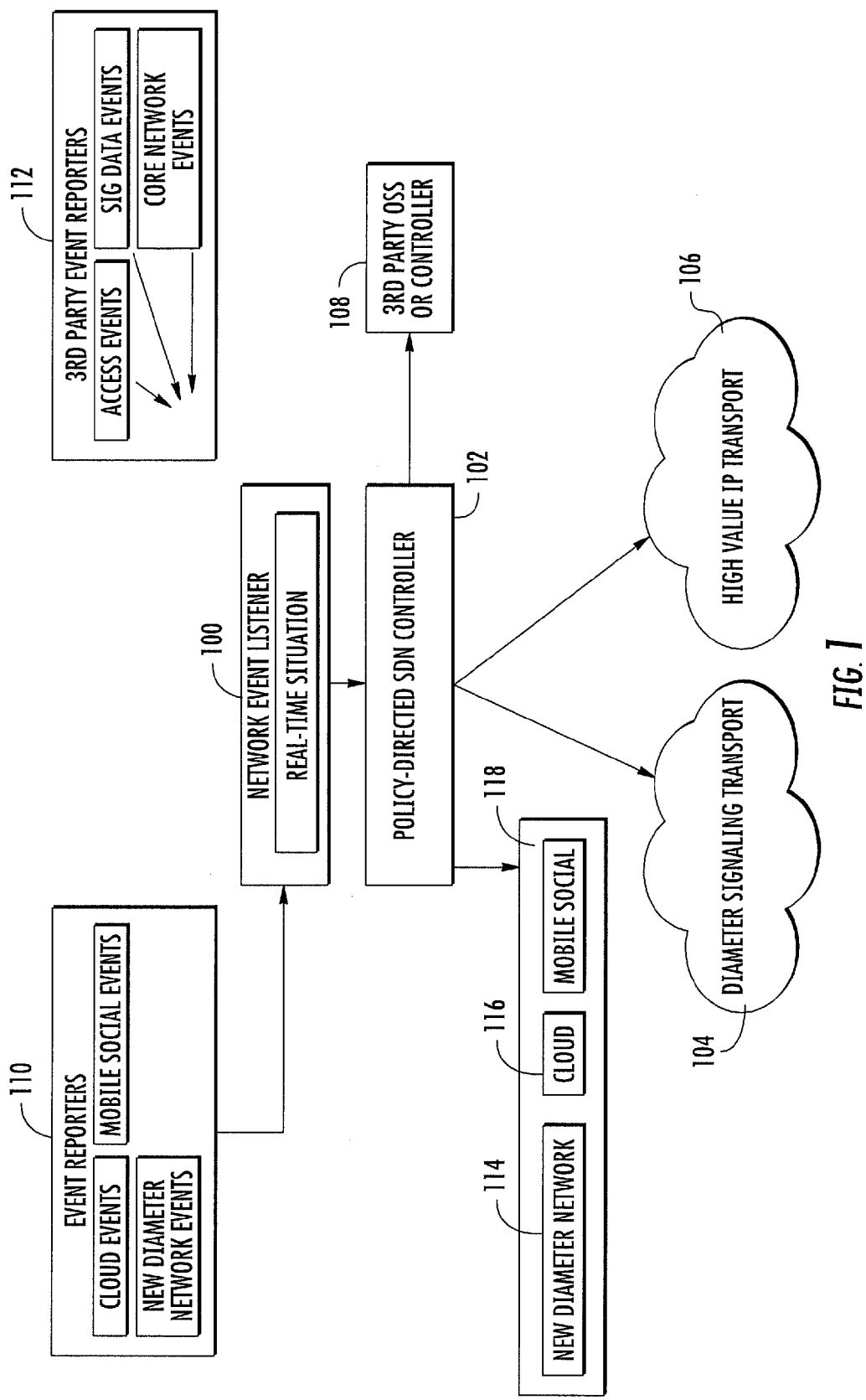
FIG. 1 is a block diagram illustrating a thinking Diameter network architecture according to an embodiment of the subject matter described herein.

Methods, systems, and computer readable media for providing a thinking Diameter network architecture are provided. FIG. 1 is a network diagram illustrating an exemplary thinking Diameter network architecture according to an embodiment of the subject matter described herein. Referring to FIG. 1, the architecture of includes a network event listener 100 for receiving information about network events and for providing a real time or predictive view of the network conditions. The real time or predictive view may be a current or predictive report or other indication of the relative loading of Diameter network resources. Network event listener 100 may report events to a policy directed SDN controller 102. Network events may include radio access network (RAN) congestion, degradation and data session setup times, excessive invocation of policies by a policy server, an excessive number of failed Diameter endpoints, and requirements for special handling of high value data sessions by the policy server. Examples of sources of information for event listener 100 may include event records, analytics, and alarms from the policy server; message information; alarms from a Diameter signaling router; congestion feeds from radio access network (RAN) probes; and overload alarms from traffic detection function. Event listener 100 may generate reports and send the reports to an advanced analytics platform to provide rich segmentation and insight into customer and network behavior to inform the policy directed SDN controller 102 and design and implement new service plans.

Policy directed SDN controller 102 receives the real time or predictive view of network conditions and issues SDN commands to route IP network flows to needed network elements and to instruct dynamically configurable network elements to instantiate Diameter resource instances. Policy directed SDN controller 102 may send SDN commands to a Diameter signaling transport network 104, a high value IP transport network 106, and a third party operations support system (OSS) or controller 108. The SDN commands sent to Diameter signaling transport network 104 may instruct Diameter signaling transport network 104 to instantiate additional Diameter signaling transport resources for processing network events based on the real-time view of the network obtained from event listener 100 or a predicted view of the network. Policy directed SDN controller may also send commands to Diameter signaling transport network 104 to deallocate network resources based on an actual or predicted view of network events. In yet another example, policy directed SDN controller 102 may send instructions to Diameter signaling network 104 to route traffic in a particular way based on current or predicted network conditions. For example, policy directed SDN controller 102 may provide SDN commands to Diameter signaling transport 104 to route traffic around congested network elements. Similar instructions may be sent to high value IP transport network 106 and third party OSS or controller 108. In high value IP transport network 106, the nodes that receive the SDN commands may be SDN compatible switches or routers.

Policy directed SDN controller 102 may receive reports or triggers from network event listener 100. Policy directed SDN controller may evaluate the network situation and make decisions based on this evaluation along with subscriber intelligence from a mobile social repository and business logic from the operator using a sophisticated, rule-based policy engine. Policy directed SDN controller 102 may direct the definition of new quality of service (QoS) rules based on IP flow conditions. Policy directed SDN controller 102 may also selectively manage high value IP flows that are associated with subscriber sessions of interest using open flow or other standards. Some examples of flows that policy directed SDN controller 102 can direct include:

a subscriber's IP flow towards a video optimization platform in order to optimize the subscriber's viewing experience based on the subscriber's device type;

a specific set of IP flows requiring deep packet inspection (DPI) services towards a DPI platform rather than requiring all IP flows to pass through the DPI improves the efficiency of the DPI since it no longer needs to process all IP traffic; and IP flows in the Diameter signaling network to route traffic around congested areas of the network based on real-time conditions and signaling loads.

In the illustrated example, network event listener 100 receives information about network conditions from event reporters 110 and 112. Event reporters 110 detect events from new Diameter network 114, virtualized Diameter network, represented in FIG. 1 as cloud 116, and mobile social network 118. Each of these networks will now be described in more detail.

Figure 2:
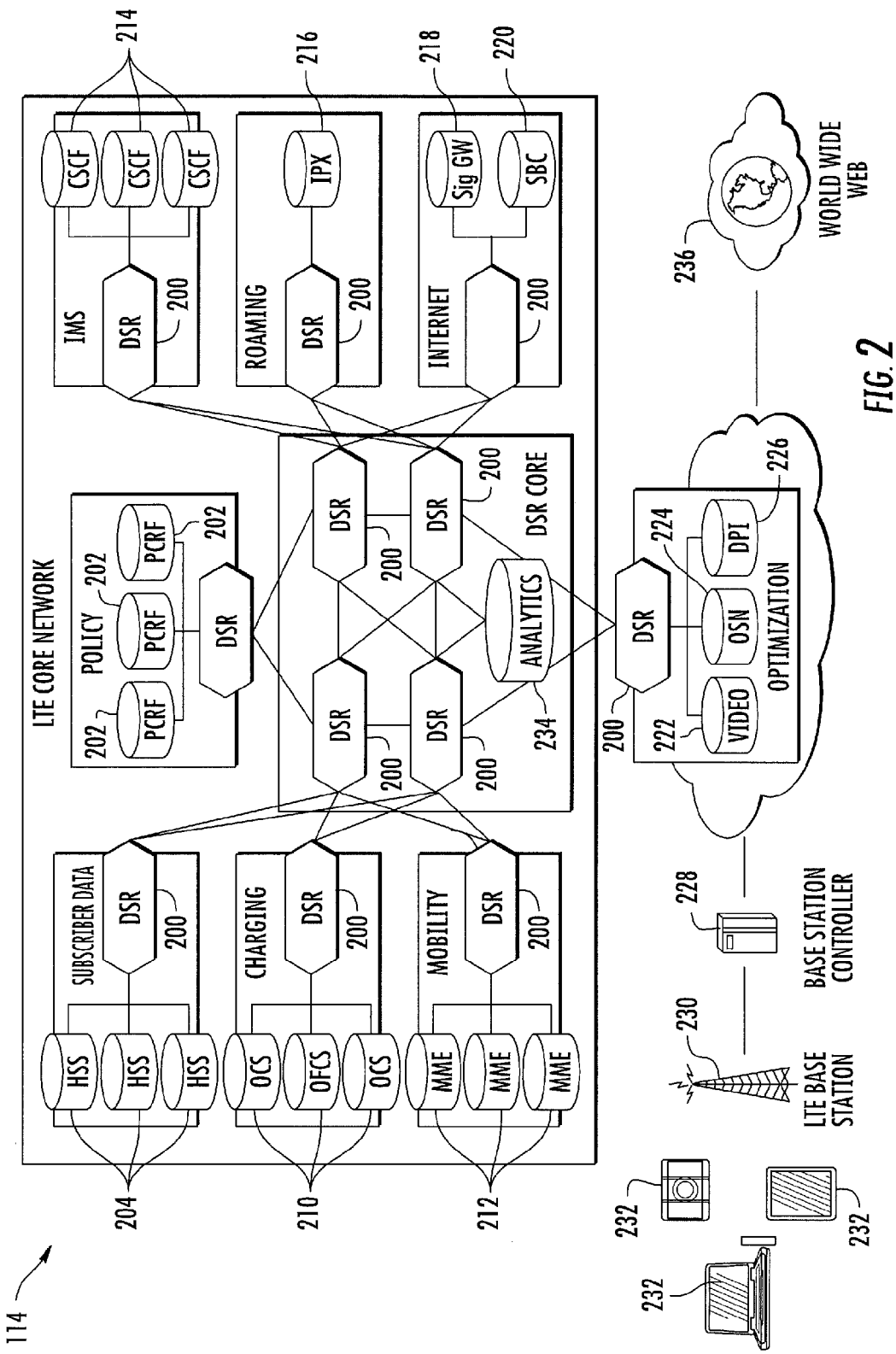
FIG. 2 is a network diagram illustrating an exemplary new Diameter network according to an embodiment of the subject matter described herein.

FIG. 2 is a block diagram illustrating new Diameter network 114 according to an embodiment of the subject matter described herein. Referring to FIG. 2, Diameter network 114 includes a plurality of Diameter signaling routers 200 that route received Diameter signaling messages based on Diameter information. The network also includes policy and charging rules functions (PCRFs) 202 that provide policies that govern network utilization. Network 114 includes home subscriber servers (HSSs) 204 that store subscriber information. Network 114 further includes online and offline charging systems 210 that store information regarding subscriber data allocations. Mobility management entities 212 provide access network services for subscribers.

In the IP multimedia subsystem (IMS) network, call session control functions (CSCFs) 214 provide registration and other services for IMS capable terminals. IPX platform 216 provides subscriber roaming services. In the Internet, signaling gateway 218 and session border controller 220 provide data connectivity services for subscriber devices.

Any of the components illustrated in FIG. 2 may report events to network event listener 100 illustrated in FIG. 1. Similarly, policy directed SDN controller 102 may issue SDN commands to dynamically route traffic to or away from any of the network elements illustrated in FIG. 1 based on received event information.

Also illustrated in FIG. 2 are video optimization platform 222, optimization service node (OSN) platform 224, and deep packet inspection (DPI) node 226. Video optimization platform 222 provides video optimization services for video flows delivered to subscriber devices over the Internet 236 or other network. OSN 224 provides optimization services to subscriber devices. DPI node 226 monitors IP flows to and from subscriber devices and between Diameter network nodes.

In the access network, a base station controller 228 and a long term evolution (LTE) base station 230 provide access network services for subscriber devices 232. In the illustrated example, subscriber devices 232 include mobile handsets, laptops, and tablet computers. An analytics platform 234 analyzes subscriber and network information copied from Diameter signaling messages by DSRs 200. For example, each DSR 200 may have a message copy function that copies received Diameter signaling messages. The copied Diameter signaling messages may be provided to analytics platform 234. Analytics platform 234 may analyze the copied Diameter signaling messages to identify subscriber preferences, which may be used to deliver targeted content to subscribers.

Figure 3:
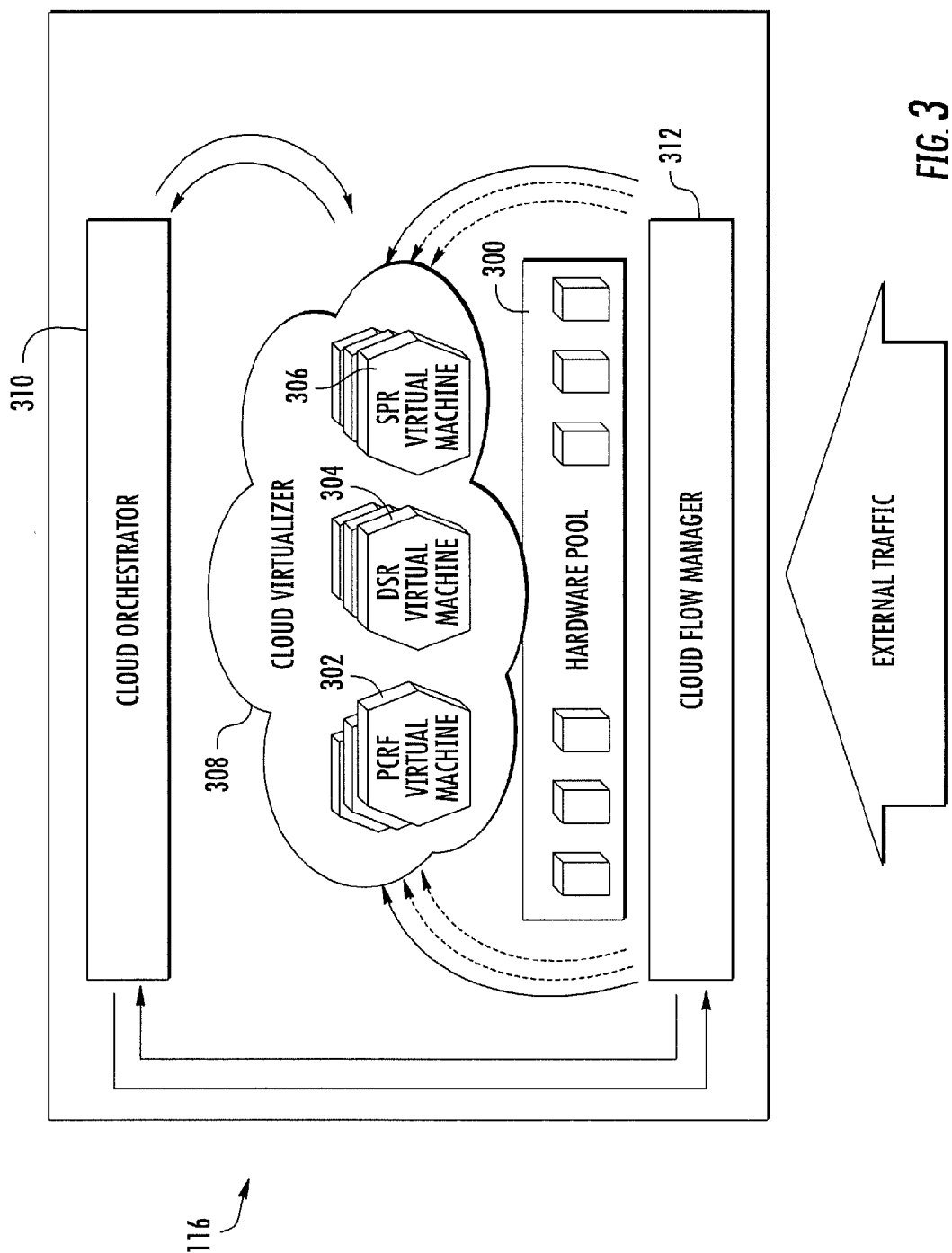
FIG. 3 is a block diagram illustrating an exemplary virtualized Diameter network architecture according to an embodiment of the subject matter described herein.

FIG. 3 is a block diagram of virtualized Diameter network 116 illustrated in FIG. 1. Referring to FIG. 3, rather than being statically provisioned based on peak network utilization, virtualized Diameter network 116 includes resource instances that may be instantiated on demand and where traffic is automatically routed to dynamically instantiated Diameter resource instances. The network architecture includes a hardware pool 300 on which Diameter resource instances, some of which may be dynamically instantiated, execute. In the illustrated example, the Diameter resource instances include policy and charging rules function (PCRF) resource instances 302, DSR resource instances 304, and subscriber profile repository (SPR) resource instances 306. Hardware pool 300 may include computing platforms, such as server platforms or server blades capable of supporting one or more Diameter resource instances. Each server blade may include a microprocessor and associated memory.

Because hardware is not always standardized, and because it may be necessary to dynamically allocate new hardware using a standard interface, a cloud virtualizer 308 is provided. Cloud virtualizer 308 uses virtualization technology, such as virtual machine technology, to dynamically allocate or re-allocate hardware resources from hardware pool 300 and to instantiate needed DSR, PCRF, or SPR resource instances on that hardware. In one example, cloud virtualizer 308 may implement or interact with a virtualization middleware layer, such as a hypervisor to dynamically allocate and deallocate hardware for Diameter resource instances.

A cloud orchestrator 310 monitors network and hardware events and instructs virtualizer 308 to dynamically allocate needed hardware resources and to dynamically instantiated DSR, PCRF, and SPR resource instances. For example, if cloud orchestrator 310 determines that the load on a DSR at a particular location recedes and there is a surge in the need for PCRF resources, orchestrator 310 may re-allocate server blades from hardware pool 300 that are currently assigned to the DSR resource instances whose load has receded to additional PCRF instances. This can be done with stateful binding to maintain sessions and context for newly-instantiated resources.

In another example, if the load on PCRF resource instances recedes and the load on DSR resource instances increases, hardware may be reallocated from the PCRF resource instance whose load has receded to the DSR resource instances in need of additional processing power. In yet another example, hardware resources assigned to SPR resource instances whose load has receded may be reassigned to DSR resource instances whose load has increased. In yet another example, hardware assigned to DSR resource instances whose load has receded may be reassigned to SPR resource instances whose load has increased. In still another example, hardware assigned to PCRF resource instances whose load has receded may be assigned to SPR resource instances whose load has increased. In still another example, hardware assigned to SPR resource instances whose load has receded may be assigned to PCRF resource instances whose load has increased. Any reallocation or reassignment of hardware among new or previously instantiated Diameter resource instances in response to network or hardware conditions is intended to be within the scope of the subject matter described herein.

Once Diameter resource instances are created and hardware is allocated to the Diameter resource instances, a cloud flow manager 312 dynamically routes traffic to the Diameter resource instances. For example, cloud flow manager 312 may use software-defined network technologies, such as OpenFlow, to dynamically manipulate traffic flows entering or leaving the network. In one exemplary scenario, when a network with one active DSR resource instance experiences a signaling traffic surge, additional server blades with DSR resources can be added to manage the traffic. Cloud orchestrator 310 instructs flow manager 312 to direct signaling flows to the newly-instantiated Diameter resource instances in the cloud. Flow manager 312 issues SDN commands, such as OpenFlow commands, to network routers to route messages to the newly-instantiated resources. The OpenFlow protocol is described in the OpenFlow Switch Specification, Version 1.1.0, Feb. 28, 2011, the disclosure of which is incorporated herein by reference in its entirety.

Any of the components illustrated in the virtualized Diameter network 116 illustrated in FIG. 3 may report network or hardware conditions to network event listener 100. Similarly, policy directed SDN controller 102 may issue commands to route traffic to any of the virtual Diameter resource instances illustrated in FIG. 3 and to dynamically allocate resources from hardware pool 300 illustrated in FIG. 3.

Figure 4:
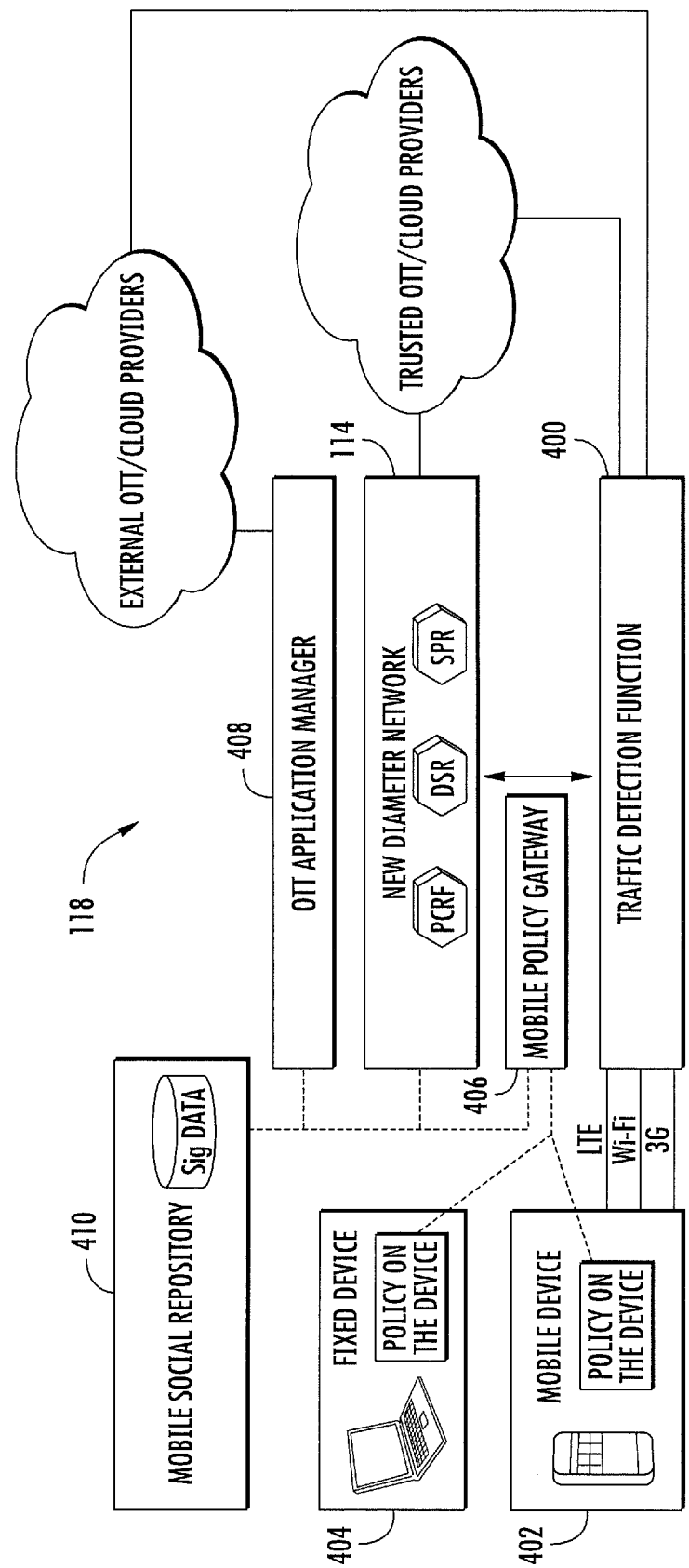
FIG. 4 is a network diagram illustrating an exemplary mobile social Diameter network architecture according to an embodiment of the subject matter described herein.

FIG. 4 is a block diagram of mobile social network architecture 118. Referring to FIG. 4, mobile social network architecture 118 includes a traffic detection function 400 that detects events from LTE, Wi-Fi, and 3G traffic to and from mobile devices 402 and fixed network devices 404. A mobile policy gateway 406 implements policy on mobile devices such that policy is applied to packets to and from the mobile devices, rather than to and from the packet data network (PDN) gateway through which devices 402 and 404 access data networks. New Diameter network 114 contains the components illustrated in FIG. 2 and the description thereof will not be repeated herein. An over the top (OTT) application manager 408 manages over the top services, such as application services, on mobile devices. A mobile social repository 410 stores events collected from devices 402 and 404 and from network components 406, 108, and 408.

Any of the components illustrated in FIG. 4 may report events to network event listener 100. Similarly, policy directed SDN controller 102 may issue SDN commands to route traffic to or away from any of the devices illustrated in FIG. 4.

Figure 5:
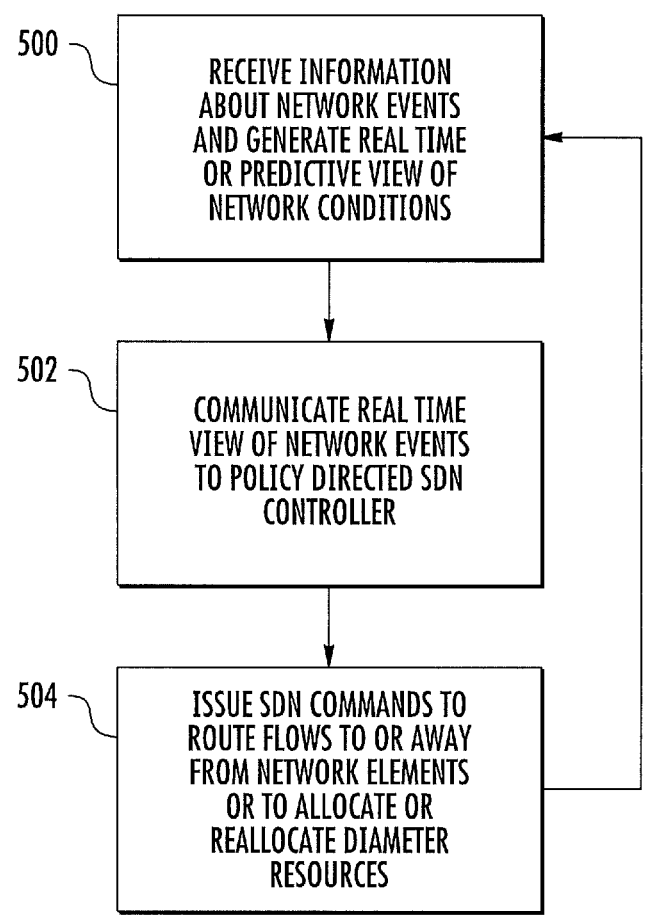
FIG. 5 is a flow chart illustrating exemplary steps for providing a thinking Diameter network architecture according to an embodiment of the subject matter described herein.

FIG. 5 is a flow chart illustrating exemplary overall steps for providing a thinking Diameter network according to an embodiment of the subject matter described herein. Referring to FIG. 5, in step 500, information is received about network events, and a real time or predictive view of network conditions is generated. For example, network event listener 100 may receive information about any of the events from any of the components described herein and generate a view of network conditions, such as congestion conditions. In one exemplary embodiment, network event listener 100 may predict future network events based on past network events. For example, if congestion occurs between the hours of 3 and 5 on one day, network event listener 100 may predict that congestion may occur at the same time on a follow day. In step 502, the real time or predictive view of network conditions is communicated to policy directed SDN controller 102. For example, network event listener 100 may communicate the real time or predictive view of network events to policy directed SDN controller 102. In step 504, commands are issued to route IP network queries to needed network elements and to construct dynamically configurable network elements to instantiate Diameter resource instances. For example, policy directed SDN controller 102 may issue SDN commands to route traffic to or away from newly instantiated or existing network elements and may instruct virtualized Diameter network 116 to instantiate new Diameter resource instances or reallocate hardware resources to handle network conditions.

The steps illustrated in FIG. 5 may be continually repeated, such that the network functions as a control system with a feedback loop. Event listener 100 may continually monitor network events and update the real time or predictive view of the network, and policy directed SDN controller 102 may continually provide the SDN commands and/or resource allocation instructions in response to the real time or updated view of the network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
   one or more computers;
   a network event listener implemented on the one or more computers and configured to receive information about network events and to generate a real time or predictive view of network conditions; and
   a policy directed software defined network (SDN) controller implemented on the one or more computers and configured to, based on the real time or predictive view of network conditions, issue SDN commands to route Internet protocol (IP) network flows to a plurality of dynamically instantiated virtual Diameter resource instances executing on a hardware pool of a virtualized Diameter network, including determining that a first load at a first virtual Diameter resource instance recedes while a second load on a second virtual Diameter resource instance increases and, in response, reallocating hardware resources of the hardware pool from the first virtual Diameter resource instance to the second virtual Diameter resource instance.

2. The system of claim 1 wherein the network event listener receives information about Diameter network events.

3. The system of claim 1 wherein the network event listener receives information about radio access network (RAN) congestion, degradation in session setup times, excessive invocation of policies by a policy server, excessive number of failed Diameter endpoints, or requirements for special handling of high-value data sessions by the policy server.

4. The system of claim 1 wherein the first virtual Diameter resource instance is a virtual Diameter signaling router (DSR) instance and the second virtual Diameter resource instance is a virtual policy and charging rules function (PCRF) instance.

5. The system of claim 4 wherein reallocating hardware resources comprises creating a new virtual PCRF instance and redirecting one or more signaling flows of the virtual PCRF instance to the new virtual PCRF instance.

6. The system of claim 5 wherein creating the new virtual PCRF instance comprises maintaining sessions and context using stateful binding.

7. The system of claim 1 wherein the dynamically instantiated virtual Diameter resource instances include at least a virtual Diameter signaling router (DSR) instance, a virtual policy and charging rules function (PCRF) instance, and a subscriber profile repository (SPR) instance, and wherein reallocating hardware resources comprises reallocating hardware resources of the hardware pool among the virtual DSR instance, the virtual PCRF instance, and the SPR instance based on changing loads at the virtual DSR instance, the virtual PCRF instance, and the SPR instance.

8. The system of claim 1 wherein the SDN commands include OpenFlow commands.

9. The system of claim 1 wherein the network event listener generates a predictive view of network conditions based on the information about network events wherein the policy directed SDN controller issues SDN commands based on the predictive view.

10. The system of claim 1 wherein the network event listener and the policy directed SDN controller function as a control system with a feedback loop to continually update the real time or predictive view of network conditions and the SDN commands and the instructions to the dynamically instantiated virtual Diameter resource instances.

11. A method comprising:
    receiving information about network events and generating a real time view of network conditions;
    communicating the real time view of network conditions to a policy directed software defined network (SDN) controller; and
    issuing SDN commands to route IP network flows to a plurality of dynamically instantiated virtual Diameter resource instances executing on a hardware pool of a virtualized Diameter network, including determining that a first load at a first virtual Diameter resource instance recedes while a second load on a second virtual Diameter resource instance increases and, in response, reallocating hardware resources of the hardware pool from the first virtual Diameter resource instance to the second virtual Diameter resource instance.

12. The method of claim 11 wherein the network events comprise Diameter network events.

13. The method of claim 11 wherein the information about network events comprises information about radio access network (RAN) congestion, degradation in session setup times, excessive invocation of policies by a policy server, excessive number of failed Diameter endpoints, or requirements for special handling of high-value data sessions by the policy server.

14. The method of claim 11 wherein the first virtual Diameter resource instance is a virtual Diameter signaling router (DSR) instance and the second virtual Diameter resource instance is a virtual policy and charging rules function (PCRF) instance.

15. The method of claim 14 wherein reallocating hardware resources comprises creating a new virtual PCRF instance and redirecting one or more signaling flows of the virtual PCRF instance to the new virtual PCRF instance.

16. The method of claim 15 wherein creating the new virtual PCRF instance comprises maintaining sessions and context using stateful binding.

17. The method of claim 11 wherein the dynamically instantiated virtual Diameter resource instances include at least a virtual Diameter signaling router (DSR) instance, a virtual policy and charging rules function (PCRF) instance, and a subscriber profile repository (SPR) instance, and wherein reallocating hardware resources comprises reallocating hardware resources of the hardware pool among the virtual DSR instance, the virtual PCRF instance, and the SPR instance based on changing loads at the virtual DSR instance, the virtual PCRF instance, and the SPR instance.

18. The method of claim 11 comprising generating a predictive view of network conditions and issuing SDN commands based on the predictive view.

19. The method of claim 11 comprising continually updating the real time or predictive view of network conditions and the SDN commands and the instructions to the dynamically instantiated virtual Diameter resource instances.

20. A non-transitory computer readable medium having stored thereon executable instructions that when executed by the processor of a computer control the computer to perform steps comprising:
- receiving information about network events and generating a real time view of network conditions;
- communicating the real time or predictive view of network conditions to a policy directed software defined network (SDN) controller; and
- issuing SDN commands to route IP network flows to a plurality of dynamically instantiated virtual Diameter resource instances executing on a hardware pool of a virtualized Diameter network, including determining that a first load at a first virtual Diameter resource instance recedes while a second load on a second virtual Diameter resource instance increases and, in response, reallocating hardware resources of the hardware pool from the first virtual Diameter resource instance to the second virtual Diameter resource instance.

* * * * *